United States Patent
Adetunji et al.

(10) Patent No.: US 10,626,243 B2
(45) Date of Patent: Apr. 21, 2020

(54) POLYMER RESIN COMPOSITION AND ARTICLES FORMED WITH THE COMPOSITION

(71) Applicant: QENOS PTY LTD, Altona, Victoria (AU)

(72) Inventors: Philip Adetunji, Burwood East (AU); Minoo Naebe, Highton (AU); Brian Egan, Altona (AU); Predrag Micic, Kew (AU); Bronwyn Fox, Highton (AU)

(73) Assignee: QENOS PTY LTD, Altona, Victoria (AU)

( * ) Notice: Subject to any disclaimer, the term of this patent is extended or adjusted under 35 U.S.C. 154(b) by 51 days.

(21) Appl. No.: 15/326,760

(22) PCT Filed: Jul. 13, 2015

(86) PCT No.: PCT/AU2015/000409
§ 371 (c)(1),
(2) Date: Jan. 17, 2017

(87) PCT Pub. No.: WO2016/007990
PCT Pub. Date: Jan. 21, 2016

(65) Prior Publication Data
US 2017/0204246 A1 Jul. 20, 2017

(30) Foreign Application Priority Data
Jul. 17, 2014 (AU) ................................ 2014902777

(51) Int. Cl.
*C08K 3/04* (2006.01)
*F16L 9/12* (2006.01)
*B82Y 30/00* (2011.01)
*C08J 3/20* (2006.01)

(52) U.S. Cl.
CPC ............... *C08K 3/04* (2013.01); *B82Y 30/00* (2013.01); *C08J 3/203* (2013.01); *C08K 3/042* (2017.05); *F16L 9/12* (2013.01); *C08J 2323/06* (2013.01); *C08K 2201/011* (2013.01)

(58) Field of Classification Search
CPC combination set(s) only.
See application file for complete search history.

(56) References Cited

U.S. PATENT DOCUMENTS

| | | |
|---|---|---|
| 3,902,532 A | 9/1975 | Carrow |
| 2007/0282067 A1 | 12/2007 | Backman et al. |
| 2010/0108173 A1* | 5/2010 | Hayes ................ B32B 1/08 138/143 |
| 2011/0114189 A1* | 5/2011 | Crain ................ B82Y 30/00 137/1 |
| 2011/0118417 A1* | 5/2011 | Liu ................ C08F 10/00 525/240 |

FOREIGN PATENT DOCUMENTS

| | | |
|---|---|---|
| CN | 103435881 A | 12/2013 |
| WO | 2013/053944 A1 | 4/2013 |

OTHER PUBLICATIONS

International Search Report and Written Opinion for corresponding Application No. PCT/AU2015/000409 (dated Sep. 11, 2015).
Jiang et al., "Multifunctional High Density Polyethylene Nanocomposites Produced by Incorporation of Exfoliated Graphite Nanoplatelets 1: Morphology and Mechanical Properties," Polymer Comp. 31(6):1091-1098 (2010).
El Achaby et al., "Processing and Properties of Polyethylene Reinforced by Graphene Nanosheets and Carbon Nanotubes," Mat. Design 44:81-89 (2013).
Extended European Search Report for 15822441.0 dated Jan. 10, 2018.
Jiang et al., "Multifunctional High Density Polyethylene Nanocomposites Produced by Incorporation of Exfoliated Graphite Nanoplatelets 1: Morphology and Mechanical Properties," Polymer Composites 1091-1098 (2010).
Xun et al., "Chapter 2: Polyethylene," In: Polyolefin Pipelines, Chemical Industry Press, pp. 55-59 and 63 (2002).
China City Gas Ass'n, "Urban Gas Polyethylene (PE) Transmission and Distribution System," China Architecture and Building Press, pp. 12, 37 (2011).
Examination Report in corresponding CN Application No. 201580038674.3 (dated Feb. 9, 2018) (with English Translation).
International Preliminary Report on Patentability for International Application No. PCT/AU2015/000409 dated Jun. 20, 2016 (with attached 16 pp. Annex).
Majer et al., "Influence of Particles—Matrix Interphase on Stress Distribution in Particulate Composite with Polymer Matrix," Applied Computational Mechanics 1:143-148 (2007).
Hu et al., "Behavior of High Density Polyethylene and Its Nanocomposites Under Static and Dynamic Compression Loadings," Polymer Composites 34:417-425 (2013).
"Basic Carburetor and Fuel System Maintenance and Tuning Tips," available at http://www.jegs.com, pp. 1-10 (2019).
Plastics Industry Pipe Association of Australia Limited, "Industry Guidelines for Polyethylene (PE) Pipes and Fittings for Compressed Air," Issue 6.9, pp. 1-6 (Aug. 2014).

* cited by examiner

Primary Examiner — Nicole M. Buie-Hatcher
(74) Attorney, Agent, or Firm — Pepper Hamilton LLP

(57) ABSTRACT

A polyethylene nanocomposite composition comprising: (i) base polyethylene resin of medium density polyethylene or high density polyethylene resin having a melt flow index in the range of from 0.10 to 1.4 g/10 min at 190° C. and 5 kg as measured according to ISO 1133, high load melt flow index of from 4 to 20 g/10 min at 190° C. and 21.6 kg as measured according to ISO 1133 and a density in the range of from about 0.930 to about 0.970 g/cm³ at 23° C. as measured according to ASTM D792; and (ii) planar carbon nanoparticles having a BET (from Brunauer-Emmett-Teller (BET) theory) surface area of at least 50 m²/g, in an amount of from 0.1% to 20% by weight based on the weight of the polyethylene nanocomposite composition.

18 Claims, 6 Drawing Sheets

POLYMER RESIN COMPOSITION AND ARTICLES FORMED WITH THE COMPOSITION

This application is a national stage application under 35 U.S.C. § 371 of PCT Application No. PCT/AU2015/000409, filed Jul. 13, 2015, which claims priority of Australia Patent Application No. 2014902777, filed Jul. 17, 2014.

TECHNICAL FIELD

The present invention relates to a polymer resin composition. In particular, the present invention relates to a polyethylene nanocomposite for manufacture of a pipe having high resistance to internal pressure comprising planar carbon nanoparticles and a base polyethylene resin. The present invention also relates to articles, preferably pipes, formed with the nanocomposite.

BACKGROUND OF INVENTION

Polyethylene (PE) resin has been used for the manufacture of pipes for the transport of fluids such as gases and liquids since the 1970's. The widespread use of polyethylene in pipe applications is due to the lightweight properties, strength, flexibility and chemical stability of the polyethylene material.

High performance polyethylene resins such as PE 80 and PE 100 resin have been developed for the production of pipes with improved resistance to slow crack growth and rapid crack propagation. Accordingly, such polyethylene resins can be used in the formation of pipes where high strength is required, such as in pipes that are pressurised during normal use. However, while PE 80 and PE 100 resins possess a number of favourable mechanical and physical properties, there remains a need to develop new polymer materials that are capable of forming pipes having one or more improved properties.

It is currently possible to make pressure pipes with a minimum required strength of 10.0 MPa using PE100 materials. A stronger PE material, suitable for pressure pipes with a minimum required strength of 11.2 MPa (PE112) or 12.5 MPa (PE125) would be very desirable. In general it has been found that attempts to prepare PE materials for pressure pipes of higher resistance to internal pressure have led to other properties, particularly toughness, processability and slow crack growth, being significantly reduced. For example, commercially available PE composition for pipe have been prepared to optimise minimum required strength (MRS) to 11.2 MPa and 12.5 MPa but the increase in resistance to internal pressure has led to brittle failures, particularly at temperatures of 60° C. and 80° C.

In other instances, the addition of particulate matter such as mineral fillers to polyethylene to improve strength and load bearing performance have typically culminated in degradation of the toughness and ductility of the composite.

A reference herein to a patent document or other matter which is given as prior art is not to be taken as an admission that the document or matter was known or that the information it contains was part of the common general knowledge as at the priority date of any of the claims.

SUMMARY OF INVENTION

We have found that incorporation of planar carbon nanoparticles into a polyethylene resin suitable for manufacture of pipe enables a significant increase in resistance to internal pressure to be realised without unduly compromising the minimum requirements for properties such as toughness, processability and slow crack growth. Polyethylene resin compositions in accordance with the invention contain a base polyethylene resin and planar carbon nanoparticles dispersed in the base polyethylene resin. The polyethylene resin composition of the invention is also referred to herein as a nanocomposite.

In accordance with one aspect the invention provides a polyethylene nanocomposite composition comprising:

(i) base polyethylene resin of medium density polyethylene or high density polyethylene resin having a melt flow index in the range of from 0.10 to 1.4 g/10 min at 190° C. and 5 kg as measured according to ISO 1133, high load melt flow index of from 4 to 20 g/10 min at 190° C. and 21.6 kg as measured according to ISO 1133 and a density in the range of from about 0.930 to about 0.970 g/cm$^3$ at 23° C. as measured according to ASTM D792; and (ii) planar carbon nanoparticles having a BET (from Brunauer-Emmett-Teller (BET) theory) surface area of at least 50 m$^2$/g, in an amount of from 0.1% to 20% by weight based on the weight of the polyethylene nanocomposite composition.

In a preferred set of embodiments there is provided a polyethylene nanocomposite composition comprising:

(i) base polyethylene resin of medium density polyethylene or high density polyethylene having a multimodal molecular weight distribution, a melt flow index in the range of from 0.10 to 1.4 g/10 min (preferably 0.10 to 0.90 g/10 min) at 190° C. and 5 kg as measured according to ISO 1133, high load melt flow index of from 4 to 20 g/10 min at 190° C. and 21.6 kg as measured according to ISO 1133 and a density in the range of from about 0.930 to about 0.970 g/cm$^3$ at 23° C. as measured according to ASTM D792; and (ii) planar carbon nanoparticles, preferably exfoliated graphite, having a BET (from Brunauer-Emmett-Teller (BET) theory) surface area of at least 50 m$^2$/g, (preferably a BET surface area of greater than 100 m$^2$/g, more preferably in the range of from 100 m$^2$/g to 1000 m$^2$/g, still more preferably from 200 m$^2$/g to 800 m$^2$/g) in an amount of from 0.1% to 20% by weight based on the weight of the polyethylene nanocomposite composition.

The base polyethylene resin generally comprises alpha olefinic comonomer regularly incorporated in the high molecular weight fraction to achieve between 2%-6% weight concentration preferably 2% to 4% by weight of the weight of the high molecular weight fraction.

In accordance with one aspect of the present invention there is provided a polyethylene nanocomposite composition for use in manufacture of pipe with a minimum required strength (MRS) of at least 10.0 MPa comprising a base polyethylene resin and planar carbon nanoparticles, preferably in an amount of from 0.1% to 20% by weight of the nanocomposite, dispersed in the base polyethylene resin. The base polyethylene resin is typically of composition for the manufacture of pipes with a minimum required strength (MRS) of at least 8.0 MPa when evaluated according to ISO 9080 statistical procedures.

In a further set of embodiments, there is provided a method of improving the minimum required strength of a polyethylene composition for pipe manufacture comprising providing a base polyethylene resin of medium or high density polyethylene having a multimodal molecular weight distribution, a melt flow index of 0.10 to 1.4 g/10 min. at 190° C. and 5 kg as measured according to ISO 1133, high load melt flow index of from 4 to 20 g/10 min. at 190° C. and 21.6 kg as measured according to ISO 1133 and a density from about 0.930 to 0.970 g/cm³ and blending with the composition with planar carbon nanoparticles of BET surface area of from 200 m²/g to 800 m²/g, to form an extrudable composition.

The base polyethylene resin employed in the nanocomposite of the invention may be selected from any polyethylene resin that is capable of producing a pipe having a minimum required strength (MRS) of at least 8.0 MPa. In some embodiments, the base polyethylene resin may be capable of producing a pipe having a minimum required strength (MRS) of at least 8.0 MPa, at least 10.0 MPa, or at least 11.2 MPa. The base polyethylene resin employed in the nanocomposite of the invention may be selected from a class of polyethylene resin selected from the group consisting of PE 80, PE 100 and PE 112 resins.

In general much of the work done in preparing polyethylene nanocomposite with a range of nanoparticle types has used a base polyethylene resin of high melt flow index. The high melt flow index has been found in many instances to be required to provide effective dispersion of nanoparticles in polyethylene. We have found that a low melt flow index is particularly advantageous in preparing the high MRS resin composite compositions of the invention. Accordingly in one set of embodiments, the nanocomposite of the invention comprises a base polyethylene resin having a melt flow index in the range of 0.10 to 1.4 g/10 min (preferably 0.10 to 0.90 g/10 min) at 190° C. and 5 kg as measured according to ISO 1133.

In one set of embodiments, the nanocomposite of the invention comprises a base polyethylene resin having a high load melt flow index in the range of from 4 to 20 g/10 min at 190° C. and 21.6 kg as measured according to ISO 1133.

In one set of embodiments, the nanocomposite of the invention comprises a base polyethylene polymer having a density in the range of from about 0.930 to about 0.970 g/cm³ at 23° C. as measured according to ASTM D792.

The base polyethylene resin employed in the nanocomposite may suitably be a medium density polyethylene (MDPE) or high density polyethylene (HDPE) resin.

The base polyethylene resin may have a unimodal or multimodal molecular weight distribution, such as for example, a bimodal or trimodal molecular weight distribution. In one exemplary embodiment, the base polyethylene resin has a bimodal molecular weight distribution.

The base polyethylene resin particularly suited to pipe manufacture generally comprises a copolymer of ethylene and at least one alpha-olefinic comonomer. The alpha-olefinic comonomer may be selected from the group consisting of 1-butene, 1-pentene, 1-hexene, 1-heptene, 1-octene, and mixtures thereof.

The nanocomposite of the present invention also comprises planar carbon nanoparticles. The planar carbon nanoparticles are dispersed in the base polyethylene resin. In one set of embodiments, the nanocomposite of the invention comprises from about 0.1 to 20%, preferably from about 1 to 15%, more preferably from about 3 to 10% by weight of planar carbon nanoparticles, based on the total weight of the nanocomposite.

Planar carbon nanoparticles employed in the nanocomposite of the invention are preferably selected from the group consisting of graphene, graphite, expanded or exfoliated graphite, and mixtures thereof. Exfoliated graphite is generally effective and is commercially available at economical cost.

The planar carbon nanoparticles may have a mean particle size in the range of from about 1 nm to 50 μm, preferably in the range of from about 10 nm to 10 μm, more preferably in the range of from about 50 nm to 5 μm.

The planar carbon nanoparticles exist in close association in graphite and in a more separated form in exfoliated graphite. Individual separated planar carbon nanoparticles are known as graphene. In general we have found that the suitable nanoparticles for use in the invention will have a relatively high surface area compared with graphite. In one set of embodiments the planar carbon nanoparticles have a BET (from Brunauer-Emmett-Teller (BET) theory) surface area at least 50 m²/g, preferably a BET surface area of greater than 100 m²/g. We have found that planar carbon nanoparticle material having a (BET) surface area at least 50 m²/g, preferably a BET surface area of greater than 100 m²/g (more preferably from 100 g/m² to 1000 m²/g such as 200 m²/g to 800 m²/g can be dispersed in the required polyethylene base having a low melt flow index using intensive mixing, such as twin screw mixer, despite the high viscosity and provide a high resistance to internal pressure without unduly compromising other desirable properties such as toughness and slow crack growth.

The polyethylene composite composition may comprise further components in an amount such as from 0 to 10% w/w, preferably from 0 to 5% w/w. Examples of further additives include stabilisers, antioxidants, lubricants, pigments and fillers. The nanocomposite of the invention desirably exhibits an improvement in one or more mechanical properties over the base polyethylene resin alone which does not contain planar carbon nanoparticles.

In one set of embodiments, the nanocomposite of the present invention has a tensile yield stress of at least 23 MPa when measured at 23° C. and a strain rate of 25 mm/min in accordance with ASTM D638. In one embodiment, the nanocomposite has a tensile yield stress in the range of from about 24 to 35 MPa when measured at 23° C. and a strain rate of 25 mm/min in accordance with ASTM D638.

In another aspect, the present invention also provides an article comprising or formed from the nanocomposite of any one of the embodiments described herein. Preferred articles may be containers or vessels, and pipes.

In one set of embodiments, the article is a pipe, preferably a pressure pipe. The pipe may be manufactured by extrusion of the nanocomposite.

In another aspect, the present invention provides a pressure vessel comprising or formed from the nanocomposite of any one of the embodiments described herein.

In another aspect, the present invention provides a pipe comprising or formed from the nanocomposite of any one of the embodiments described herein.

In one set of embodiments, a pipe comprising or formed from a nanocomposite of any one of the embodiments described herein has a Minimum Required Strength of at least 11.2 MPa when evaluated according to ISO 9080 statistical procedures. In one set of embodiments the pipe has a Minimum Required Strength at least 11.2 MPa, preferably at least 12.5 MPa, when evaluated according to ISO 9080 statistical procedures. Pipes comprising or formed with a nanocomposite of the invention exhibit improvements in one or more properties, when compared with a comparative pipe prepared with the same base polyethylene resin as used in the nanocomposite, but without the planar carbon nanoparticles.

In one set of embodiments, a pipe comprising or formed with a nanocomposite of any one of the embodiments described herein has a Minimum Required Strength that is at least 5% greater than the Minimum Required Strength of a comparative pipe formed with the same base polyethylene resin as used in the nanocomposite without the planar carbon nanoparticles.

In one set of embodiments, a pipe comprising or formed with a nanocomposite of any one of the embodiments described herein has a Long Term Hydrostatic Strength that is at least 5% greater than the Long Term Hydrostatic Strength of a comparative pipe formed with the same base polyethylene resin as used in the nanocomposite without the planar carbon nanoparticles.

In one set of embodiments, a pipe comprising a nanocomposite of any one of the embodiments described herein exhibits a loss in resistance to slow crack growth of no more than 50%, when compared to a comparative pipe formed with the same base polyethylene resin as used in the nanocomposite without the planar carbon nanoparticles.

In one set of embodiments, a composition comprising a nanocomposite of any one of the embodiments described herein has slow crack growth resistance of at least 1000 hours, or at least 2000 hrs when tested according to the procedure described in ASTM F1473-97 (Pennsylvania Notched test) at 80° C. in air and 2.4 MPa tensile stress with a notch depth of 5 mm.

In one set of embodiments, a pipe comprising a nanocomposite of any one of the embodiments described herein has a slow crack growth property of at least 500 hrs when tested at 80° C. and 9.2 bar pressure according to ISO 13479. The pipe is typically evaluated as a 110 mm OD SDR11 pipe.

In one set of embodiments, a pipe comprising a nanocomposite of any one of the embodiments described herein exhibits a loss in resistance to rapid crack propagation of no more than 50%, when compared to a comparative pipe formed with the same base polyethylene resin as used in the nanocomposite without the planar carbon nanoparticles.

In one set of embodiments, a composition comprising a nanocomposite of any one of the embodiments described herein has a charpy impact strength at 0° C. of at least 10 kJ/m$^2$ determined according to ISO 179.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
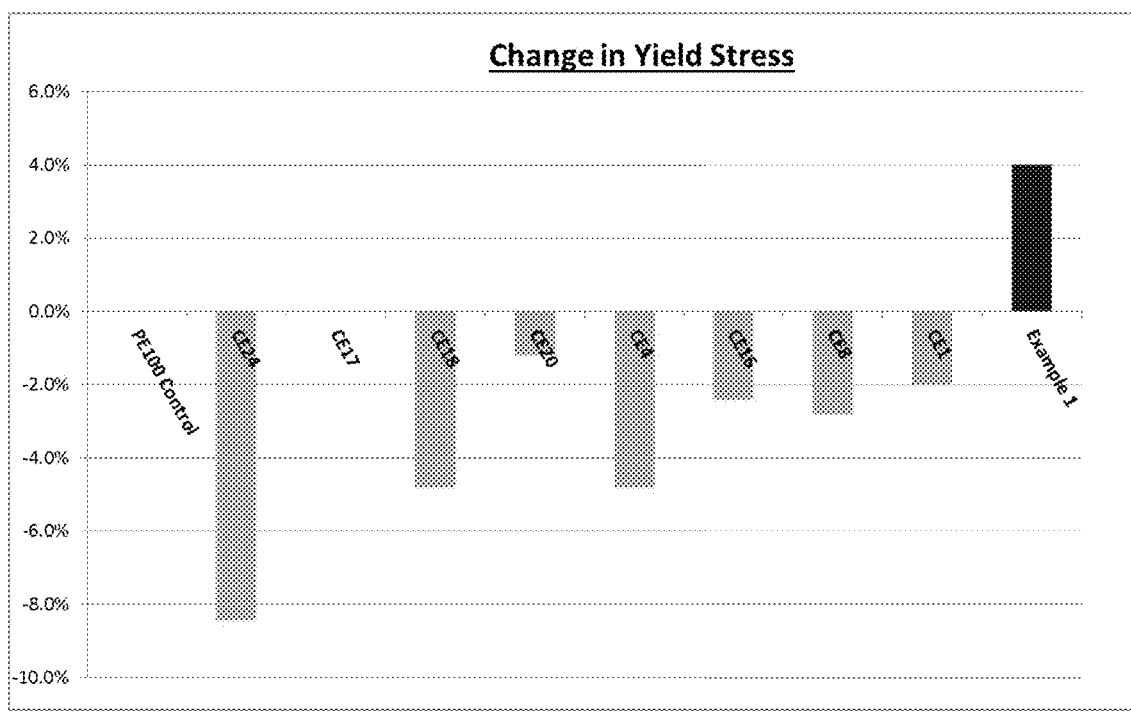
FIG. 1 is a graph illustrating the percent change in yield stress over a PE100 resin control, comparative nanocomposites comprising various comparative nanoparticles, and a nanocomposite of an embodiment of the invention comprising exfoliated graphite nanoparticles.

The present invention relates to a polyethylene resin composition comprising planar carbon nanoparticles. The polyethylene resin composition of the invention is also referred to herein as a nanocomposite. As used herein, the term "nanocomposite" denotes a composition comprising a mixture of planar carbon nanoparticles and a base polyethylene resin. The base polyethylene resin employed in the nanocomposite is suitably a high density polyethylene (HDPE) or medium density polyethylene (MDPE) resin.

In accordance with one aspect of the present invention there is provided a nanocomposite comprising a base polyethylene resin and planar carbon nanoparticles dispersed in the base polyethylene resin, wherein the base polyethylene resin is suitable for the manufacture of pipes with a minimum required strength (MRS) of at least 8.0 MPa when evaluated according to ISO 9080 statistical procedures.

In one set of embodiments, the planar carbon nanoparticles employed in the nanocomposite is selected from the group consisting of graphene, graphite, exfoliated graphite, and mixtures thereof. Further discussion on the planar carbon nanoparticles is provided below.

The present invention relates to efforts to improve one or more properties of a base polyethylene resin that is suitable for the manufacture of pipes that at least meet the requirements for PE 80 pipe and preferably, at least meet the requirements for PE100 pipe, and most preferably, meets or exceeds the requirements for a PE 112 pipe. The inventors have found that the incorporation of planar carbon nanoparticles into a base polyethylene resin allows one or more properties of the base polyethylene resin to be improved or enhanced.

As used herein the term "base polyethylene resin" refers to a polyethylene polymer resin that does not contain planar carbon nanoparticles.

The base polyethylene resin employed in the nanocomposite of the invention may be selected from any polyethylene resin that is capable of producing a pipe having a minimum required strength (MRS) of at least 8.0 MPa when evaluated according to ISO 9080. The MRS represents a design stress rating and relates to the circumferential stress that a pipe can withstand at a temperature of 20° C. for 50 years without failure at a specified temperature.

In one set of embodiments, the base polyethylene resin may be capable of producing a pipe having a minimum required strength (MRS) of at least 8.0 MPa, at least 10.0 MPa, or least 11.2 MPa when evaluated according to ISO 9080.

Pipes with an MRS of 8.0 MPa, 10.0 MPa or 11.2 MPa are capable of withstanding internal pressures of at least 8.0 MPa, 10.0 MPa, and at least 11.2 MPa, respectively, for 50 years at 20° C.

The base polyethylene resin employed in the nanocomposite of the invention may belong to a class of polyethylene resin selected from the group consisting of PE 80, PE 100 and PE 112 resins. The terms ""PE 80", and "PE 100"" are classifications for polyethylene resin described in ISO 1167.

Polyethylene resins falling within a particular class of resin may have different compositional characteristics although common to each member of the class is the ability to meet or exceed the MRS rating defined for that class.

Polyethylene resins belonging to the class of, PE 80, PE 100 or PE 112 resins may have at least one of the following properties, and may have a combination of two or more of these properties:
- a melt flow index (MFI) in the range of 0.10 to 1.4 g/10 min (preferably 0.1 to 0.90 g/10 min) at 190° C. and 5 kg as measured according to ISO 1133;
- a high load melt flow index ((HLFI) in the range of from 4 to 20 g/10 min at 190° C. and 21.6 kg as measured according to ISO 1133; and
- a density in the range of from about 0.930 to about 0.970 g/cm$^3$ at 23° C. as measured according to ASTM D792.

It is preferred the base resin will have all of these properties.

Melt flow index (MFI) and high load melt flow index (HLFI) provide an indication of the flowability and processability of the base polyethylene resin and are related to the viscosity of the base resin in its molten state. MFI and HLFI may also be related to the average molecular weight of the polymer chains in the polyethylene resin. A lower melt index at a defined load and temperature is indicative of higher viscosity and a higher average molecular weight for the base polyethylene resin. The density of the base polyethylene resin can provide an indication of the tensile yield stress and toughness of the base polymer resin.

In some embodiments of the nanocomposite of the invention, the base polyethylene resin has a melt flow index (MFI) in the range of 0.10 to 1.4 g/10 min (preferably 0.10 to 0.90 g/10 min), more preferably a melt flow index (MFI) in the range of 0.10 to 0.40 g/10 min, at 190° C. and 5 kg a s measured according to ISO 1133.

In some embodiments of the nanocomposite of the invention, the base polyethylene resin has a high load melt flow index (HLFI) in the range of from 4 to 20 g/10 min at 190° C. and 21.6 kg as measured according to ISO 1133.

In some embodiments of the nanocomposite of the invention, the base polyethylene resin has a density of at least 0.930 g/cm$^3$, preferably a density in the range of from about 0.940 to about 0.970 g/cm$^3$, more preferably a density in the range of from about 0.945 to about 0.96 g/cm$^3$, at 23° C. as measured according to ASTM D792.

In one set of embodiments, it can be desirable for the base polyethylene resin to have a high density (greater than about 0.940 at 23° C.) and a low melt flow index (less than about 0.90 g/10 min at 190° C. and 5 kg).

The base polyethylene resin comprises at least one polyethylene polymer, and may comprise a blend of two or more polyethylene polymers, such as a blend of a polyethylene copolymer and a polyethylene homopolymer or a blend of two or more polyethylene copolymers of different molecular weight and/or composition.

The base polyethylene resin employed in the nanocomposite may have a unimodal or multimodal molecular weight distribution. A multimodal molecular weight distribution may, for example, be a bimodal or trimodal molecular weight distribution. In one set of embodiments, the base polyethylene resin has a bimodal molecular weight distribution. Generally, a multimodal resin is more preferred as this allows a higher strength to be obtained particularly where there is regular incorporation in the higher molecular weight fraction of an alpha olefin.

A person skilled in the relevant art would understand that a polyethylene resin having a multimodal molecular weight distribution would contain two or more polymer fractions of different average molecular weight. A multimodal molecular mass distribution can be determined using conventional techniques, such as gel permeation chromatography (GPC). The different average molecular weights of different polymer fractions in a multimodal polyethylene resin may be observed as different distinct maxima in a molecular weight distribution curve for the polymer resin. In some instances, the presence of different polymer fractions may also be observed as a broadening of the molecular weight distribution curve or a deviation in the shape of the distribution curve from a normal Gaussian curve. A bimodal polyethylene would contain two polymer fractions of different average molecular weight, which could be observed as two distinct maxima.

The nanocomposite of the present invention may comprise a suitable base polyethylene resin, which may be selected from any one of the polyethylene resins known in the art that is capable of producing a pipe having a minimum required strength (MRS) of at least 8.0 MPa, preferably at least 10.0 MPa. Polyethylene resins of 8.0 MPa are generally less preferred as resins of 10.0 MPa can be readily prepared using the process technology which provides regular incorporation of alpha-olefinic comonomer into the high molecular weight fraction of a multimodal polyethylene. However the incorporation of planar nanoparticles also allows MRS of 10.0 MPa or higher to be prepared from resin for which such high MRS has not previously been accessible.

Some examples of base polyethylene resins that may be used in the nanocomposite of the invention are described in U.S. Pat. No. 6,441,096, WO 01/79345, EP 1460105, U.S. Pat. Nos. 6,878,784, 6,787,608 and WO 2013/110452, incorporated herein by reference.

In one set of embodiments, a base polyethylene resin suitable for use in the nanocomposite may be a bimodal polyethylene resin. The bimodal polyethylene resin has a bimodal molecular weight distribution comprising a low molecular weight polymer fraction and a high molecular weight polymer fraction. The low molecular weight polymer fraction may constitute from about 10 to 90% by weight of the polyethylene resin. The high molecular weight polymer fraction in the polyethylene resin may constitute a weight fraction (% weight) such that the sum of the low molecular weight polymer fraction and the high molecular weight polymer fraction is 100% by weight, with % by weight being relative to the total weight of the polyethylene resin.

In some embodiments, the base polyethylene resin is a bimodal polyethylene resin comprising a low molecular weight polymer fraction which is from 20 to 80% by weight, preferably from 25 to 70% by weight, more preferably from 30 to 60% by weight, of the total weight of the polyethylene resin, and a high molecular polymer fraction which is from 80 to 20%, preferably from 75 to 30%, more preferably from 70 to 40% by weight, of total weight of the polyethylene resin.

In one set of embodiments, the high molecular weight polymer fraction comprises a polyethylene copolymer. In some embodiments, the high molecular weight polymer fraction comprises polymer chains having a weight average molecular weight of more than 50,000. In some embodiments, the polymer chains of the high molecular weight fraction have a lower molecular weight limit of 3500.

The low molecular weight polymer fraction may comprise a polyethylene homopolymer or a polyethylene copolymer. The polymer chains present in the low molecular weight polymer fraction are generally of lower average molecular weight than the polymer chains of the high molecular polymer weight fraction. Solution viscosity measurements may be used to ascertain the average molecular weight of a polymer fraction.

In one set of embodiments, the low molecular weight polymer fraction comprises polymer chains having a weight average molecular weight of 50,000 or less. In one preference, the low molecular weight polymer fraction comprises chains of polyethylene homopolymer or copolymer.

As used herein, the term "polyethylene homopolymer" refers to an ethylene polymer that consists substantially (i.e. at least 90% by weight, preferably at least 95% by weight, more preferably at least 97% by weight) of ethylene and thus a polyethylene homopolymer preferably predominately comprises ethylene monomer.

As used herein, the term "polyethylene copolymer" refers to a polymer that is formed from the copolymerisation of ethylene and at least one co-monomer. Preferably, the co-monomer is at least one alpha-olefin. The alpha-olefin co-monomer may comprise from 3 to 12 carbon atoms, preferably from 4 to 8 carbon atoms. In some embodiments, the alpha-olefin co-monomer is selected from the group consisting of 1-butene, 1-pentene, 1-hexene, 1-heptene, 1-octene and mixtures thereof. In one preference, the alpha-olefin co-monomer is selected from the group consisting of C4, C5 and C6 alkenes, and mixtures thereof, and preferably, may be selected from the group consisting of 1-butene, 1-pentene, 1-hexene and mixtures thereof.

Polyethylene copolymer present in the high molecular weight polymer fraction of a bimodal polyethylene resin may comprise alpha-olefin in an amount from about 0.5% to 8% by weight, preferably from about 2% to 6% by weight (or from 2% to 4% by weight), based on the weight of the high molecular weight polymer fraction. It is preferred that the alpha olefin is regularly distributed along the polymer backbone of the high molecular weight fraction.

In one set of embodiments, the base polyethylene resin is a multimodal PE 100 resin, preferably a bimodal PE 100 resin.

In some embodiments, the nanocomposite of the invention comprises a bimodal PE 100 resin as a base polyethylene resin. The bimodal PE 100 resin may comprise a high molecular weight polymer fraction having a solution viscosity of at least 500 cm$^3$/g. Preferably, the solution viscosity of the high molecular weight polymer fraction is greater than 500 cm$^3$/g.

A bimodal PE 100 resin employed as a base polyethylene resin may comprise polyethylene copolymer having an amount of alpha-olefin monomer sufficient to achieve an extent of short chain branching in the polyethylene resin of between 5 to 25 per 1000 carbon atoms in the high molecular weight polymer fraction, and an extent of short chain branching of between 2 to 15 per 1000 carbon atoms in the combined high and low molecular weight polymer fractions.

The base polyethylene resin employed in the nanocomposite of the invention may be prepared using conventional processes known in the art, including continuous and batch-wise processes, employing monomers known in the art. Conventional processes for preparing suitable base polyethylene resins may involve the polymerisation of appropriate monomers in the presence of catalysts, such as Ziegler-Natta, transition metal or metallocene catalysts.

The nanocomposite of the present invention also comprises planar carbon nanoparticles dispersed in the base polyethylene resin. In one form of the nanocomposite of the invention, the planar carbon nanoparticles are selected from the group consisting of graphene, graphite, exfoliated graphite nanoparticles, and mixtures thereof.

Graphite consists of a plurality of layered planes of hexagonal arrays or networks of carbon atoms. The layered planes of hexagonally arranged carbon atoms are substantially flat and are oriented substantially parallel to one another. The carbon atoms on a single layered plane are covalently bonded together, and the layered planes are bonded by substantially weaker van der Waals forces. Graphite is also an anisotropic structure and exhibits many properties that are highly directional. Graphite also possesses a high degree of orientation. Graphite includes natural graphite, Kish graphite and synthetic graphite. Natural graphite is found in nature. Kish graphite is the excess carbon, which crystallizes in the course of smelting iron. Synthetic graphite is typically produced by pyrolysis or thermal decomposition of a carbonaceous gas at elevated temperatures above 2500° C.

Planar carbon nanoparticles employed in the nanocomposite of the invention are generally in particle form and have at least one dimension (e.g. diameter) in the nanometer range. In some embodiments, the planar carbon nanoparticles may be in the form of nanosheets, nanoplatelets, nanoflakes, and the like. It is preferred that the carbon nanoparticles employed in the nanocomposite have a planar structure as it has been found that non-planar particles (e.g. carbon nanotubes and nano-sized carbon black particles or powder) do not provide the desired improvement in mechanical properties.

In some embodiments, the nanocomposite of the invention comprises graphene. Graphene is a monolayer carbon material consisting of a one-atom thick planar array of carbon atoms arranged in a two-dimensional hexagonal lattice pattern. Graphene is a component of graphite, which is a layered planar structure composed of stacks of graphene. Graphene may be obtained from graphite that has undergone an expansion and/or exfoliation procedure that allows individual sheets of graphene to be separated from one another.

In some embodiments, the nanocomposite of the invention comprises exfoliated graphite nanoparticles (xGnP). Exfoliated graphite nanoparticles are also obtained from graphite and consist of small stacks of graphene sheets. Generally, in exfoliated graphite nanoparticles, the sheets of graphene are not completely separated from one another. In some embodiments the exfoliated graphite nanoparticles have fewer than 50 single sheet layers, preferably fewer than 20 single sheet layers of graphene. Exfoliated graphite nanoparticles may also be known in the art as expanded graphite.

Graphene and exfoliated graphite nanoparticles may be obtained by treating graphite using methods known in the art, such as fluorination, acid treatment, high temperature thermal treatment, mechanical pulverisation, milling and the like. Such treatment may result in expansion and/or exfoliation of the graphite to produce graphene or exfoliated graphite nanoparticles, or both types of nanoparticles in combination.

To expand or exfoliate the inter-planar spacing between the layered planes, the intercalated graphite is exposed to very high heat in a relatively short amount of time. Without being bound by any particular theory, the exfoliated mechanism is the decomposition of the trapped intercalating agent, such as sulfuric and nitric acids ($H_2SO_4+HNO_3$), between the highly oriented layered planes when exposed to heat.

Suitable exfoliated processes include heating the intercalated graphite for a few seconds at temperatures of at least greater than 500° C., more preferably greater than 700° C., and more typically 1000° C. or more. The treated graphite typically expands in the "c" direction 100 to more than 300 times the pre-treatment thickness. In one preferred exfoliating process, the intercalated graphite is exposed to temperature of 1050° C. for 15 seconds to achieve a thickness in the "c" direction of 300 times of that in the pre-exfoliated graphite. For natural graphite with original thickness of 0.4 µm to 60 µm, the thickness of exfoliated graphite can be in the range of 2 µm to 20,000 µm.

In one set of embodiments, the planar carbon nanoparticles may have a mean particle size in the range of from about 1 nm to 50 µm, preferably in the range of from about 10 nm to 10 µm, more preferably in the range of from about 50 nm to 5 µm. The average thickness (smallest) dimension may be less than or equal to 5.0 nm.

In one set of embodiments, the planar carbon nanoparticles may have an aspect ratio of greater than or equal to about 50:1.

In one set of embodiments the planar carbon nanoparticles have a BET surface area at least 50 $m^2/g$, preferably a BET surface area in the range of 200 $m^2/g$ and 800 $m^2/g$.

We have found that the range of BET from 100 $m^2/g$ to 1000 $m^2/g$, more preferably 200 $m^2/g$ to 800 $m^2/g$, is particularly useful in improving resistance to internal pressure without unduly compromising other properties. Generally below this range the improvement in resistance to internal pressure at a given concentration is reduced. Furthermore, above the range the process of melt blending generally results in clusters or agglomerates of the planar composite nanoparticles which can significantly compromise the desired strength, toughness and processing of the nanocomposite.

The nanocomposite of the invention comprises a suitable quantity of planar carbon nanoparticles. In one set of embodiments, the nanocomposite comprises from about 0.1 to 20%, from about 1 to 15%, or from about 3 to 10% by weight of planar carbon nanoparticles, based on the total weight of the nanocomposite. The present inventors have advantageously found that significant improvement in properties can be achieved through the use of only a relatively small quantity of planar carbon nanoparticles in the nanocomposite.

In one form, the nanocomposite of the invention may be prepared by adding a desired amount of planar carbon nanoparticles to a desired quantity of base polyethylene resin as described herein and melt mixing the planar carbon nanoparticles with the base polyethylene resin.

In one set of embodiments, the mixture of planar carbon nanoparticles and a base polyethylene resin in powder form may be fed to a polymer melt extruder, melt mixer or preferably a twin-screw compounder and melt blended to form the nanocomposite. Melt blending of the components is conducted so as to achieve the effective dispersion and distribution of the planar carbon nanoparticles in the base resin. The polymer melt extruder or mixer need to be operated under conditions suitable for forming a homogenous nanocomposite. In an exemplary embodiment, the twin screw compounder is operated at a temperature of at least 180° C. with a specific energy input greater than 0.10 kWhr/kg. In one preferred set of embodiments of the twin screw compositions of use in the process comprises a screw configuration consists of forward conveying and left handed screw elements in addition to kneading blocks elements. Similar results were achieved on a Brabender rheomixer. Other types of compositions may be used to obtain homogenous nanocomposites having regard to the objections and processes described herein.

In some embodiments the present invention provides a process for the preparation of a nanocomposite of any one of the embodiments described herein, wherein the process comprises the step of melt mixing planar carbon nanoparticles with a base polyethylene resin, wherein the base polyethylene resin is selected from any one of the polyethylene resins described herein. Preferably, the base polyethylene resin is suitable for manufacturing a pipe having an MRS of at least 8.0 MPa when evaluated according to ISO 9080 statistical procedures. In one set of embodiments, the planar carbon nanoparticles may be melt blended with the base polyethylene resin.

In other embodiments, the nanocomposite of the invention may be prepared by forming a masterbatch composition comprising planar carbon nanoparticles and a quantity of a base polyethylene resin, then mixing an amount of the masterbatch composition with a further quantity of a base polyethylene resin. The use of a masterbatch may advantageously aid a more uniform dispersion of the planar carbon nanoparticles within the base polyethylene resin on melt mixers or extruders with less intensive kneading and dispersive capability.

Thus in another aspect, the present invention provides a process for the preparation of a nanocomposite of any one of the embodiments described herein, the process comprising the steps of mixing planar carbon nanoparticles with a quantity of a base polyethylene resin to form a masterbatch composition; and melt blending the masterbatch composition with a further quantity of base polyethylene resin to provide the nanocomposite. The base polyethylene resin used in the formation of both the masterbatch composition and the nanocomposite may be selected from any one of the polyethylene resins described herein as being suitable as a base resin. Preferably, the base polyethylene resin is suitable for the manufacture of pipes with a MRS of at least 8.0 MPa when evaluated according to ISO 9080 statistical procedures.

The base polyethylene resin employed in the masterbatch composition and in the nanocomposite may be the same or different.

In preferred embodiments, the same base polyethylene resin is employed in both the masterbatch composition and in the nanocomposite. The use of the same base polyethylene resin will avoid any incompatibility issues or the risk of dilution or deterioration of the properties of the base polymer arising from the use of different types or grades of polyethylene resin.

In one set of embodiments, the masterbatch composition may be formed by mixing a desired quantity of planar carbon nanoparticles with a quantity of base polyethylene powder in a tumble blender, then feeding the resulting mixture to a polymer melt extruder or preferably a twin screw compounder and melt blending the mixture. The extruder may be operated at a temperature of least 180° C. with specific energy input greater than 0.10 kWhr/kg.

In embodiments when a masterbatch composition is used, the masterbatch composition may comprise from 5 to 50% by weight of planar carbon nanoparticles, based on the weight of the masterbatch composition. In one exemplary embodiment, the masterbatch composition may comprise planar carbon nanoparticles in an amount of about 20% by weight, based on the weight of the masterbatch composition.

The masterbatch composition may be in the form of a powder or pellets, preferably pellets.

A suitable amount of the masterbatch composition may be combined with an amount of base polyethylene resin to provide a nanocomposite. In one set of embodiments an amount of masterbatch composition in the range of from about 5 to 50% (w/w) is combined with a desired quantity of base polyethylene resin. The resulting nanocomposite will then contain a desired quantity of planar carbon nanoparticles. As mentioned above, the nanocomposite preferably comprises from about 0.1 to 20%, from about 1 to 15%, or from about 3 to 10% by weight of planar carbon nanoparticles. A skilled person would be able to determine the quantities of masterbatch composition and base polyethylene resin that are to be blended together to form the nanocomposite, having regard to the concentration of nanoparticles in the masterbatch composition.

In one set of embodiments a desired quantity of the masterbatch composition may be melt blended with an amount of the base polyethylene resin to form the nanocomposite. The masterbatch composition may be melt blended with an amount of base polyethylene resin in an extruder, such as a twin screw compounder. The extruder may be operated under the same conditions as that used to form the masterbatch composition. In some embodiments, the twin screw compounder may be operated at a temperature of least 180° C. with specific energy input greater than 0.10 kWhr/kg.

The nanocomposite of the invention may be in the form of pellets, powder or pre-mix.

As used herein, the term "pre-mix" refers to a mixture of base polyethylene resin with planar carbon nanoparticles, or planar carbon nanoparticle masterbatch or compound, which is formed by tumble or rotary blending of the components in a mixer to achieve homogenisation.

The nanocomposite of the invention desirably exhibits an improvement in one or more mechanical properties over the base polyethylene resin alone which does not contain the planar carbon nanoparticles.

In one set of embodiments, the nanocomposite of the present invention has a tensile yield stress of at least 23 MPa when measured at 23° C. and a strain rate of 25 mm/min in accordance with ASTM D638. In one embodiment, the nanocomposite has a tensile yield stress in the range of from about 24 to 35 MPa when measured at 23° C. and a strain rate of 25 mm/min in accordance with ASTM D638.

Without wishing to be limited by theory, it is believed that the planar carbon nanoparticles may act to reinforce the base polyethylene resin and thereby enhance one or more mechanical properties of the base resin. Properties that may be improved through the incorporation of planar carbon nanoparticles in the base polyethylene resin may be selected from at least one of the following: modulus of elasticity, tensile yield stress, hoop stress rating, flexural modulus, UV resistance, and reduced rate of gas transmission. The present invention therefore allows a measurable enhancement in performance to be achieved without a significant loss of other desirable characteristics, such as tensile strength, ultimate elongation, melt index, thermal stability, impact strength, slow crack growth resistance and rapid crack propagation resistance.

In one set of embodiments, the nanocomposite of the present invention provides an improvement in tensile yield stress of at least 3%, preferably at least 4%, more preferably at least 5%, most preferably at least 6%, over the base polyethylene resin alone, without a detrimental loss of toughness. Any loss of toughness may be reflected in results obtained for tensile strength at break and ultimate elongation.

In some embodiments, the nanocomposite of the invention exhibits a loss in tensile strength at break of no more than about 50%, preferably no more than about 40% more preferably no more than about 30%, relative to the base polyethylene resin alone.

In one set of embodiments, the nanocomposite of the present invention exhibits a loss in ultimate elongation of no more than about 50%, preferably no more than about 40% more preferably no more than about 30%, relative to the base polyethylene resin alone.

A person skilled in the relevant art would appreciate that the ductility of a polymer composite, as reflected by the tensile strength and ultimate elongation, can provide an indicator of likely performance in Pennsylvania notch test (PENT) according to ASTM F1473 and charpy impact strength according to ISO179. Typically, a significant decrease in tensile strength and ultimate elongation will point to a reduction in material toughness and slow crack growth resistance.

In some embodiments, the nanocomposite of the invention exhibits a loss of charpy impact strength of no more than 50% when compared to the base polyethylene resin alone, as evaluated according to ISO 179.

In some embodiments, the nanocomposite of the invention exhibits a loss of slow crack growth resistance of no more than 50% when compared to the base polyethylene resin alone, as indicated by the Pennsylvania notch test (PENT) and evaluated according to ASTM F1473.

In another aspect, the present invention also provides an article comprising, or formed from, a nanocomposite of any one of the embodiments described herein. In one set of embodiments, the present invention provides an article formed with a nanocomposite described herein. Preferred articles may be containers or vessels, and pipes. In one set of embodiments, the article is a pressure vessel or a pipe.

In one set of embodiments, the article is a pipe. The pipe may be manufactured by conventional techniques, such as by extrusion. In one embodiment, the nanocomposite is extruded to form a pressure pipe. The term "pressure pipe" as used herein is meant a pipe which, when used, is subjected to positive pressure, i.e. the pressure inside the pipe is higher than the pressure outside the pipe.

In another aspect, the present invention provides a pipe, preferably a pressure pipe, comprising, or formed from, a nanocomposite of any one of the embodiments described herein.

In another aspect, the present invention provides use of a nanocomposite of any one of the embodiments described herein in the manufacture of an article. In one set of embodiments, the article may be a pressure vessel or a pipe, preferably a pressure pipe.

The nanocomposite of the invention may optionally comprise other compounds or components that are conventionally used in the manufacture of articles such as pipes, more particularly, pressure pipes. In one set of embodiments, the nanocomposite may optionally comprise one or more additives. The optional additives may be selected from the group consisting of stabilisers (e.g. heat stabilisers), antioxidants, lubricants, pigments (e.g. carbon black), fillers, UV additives, neutralising additives (e.g. calcium stearate and zinc stearate) and combinations thereof. The additives may constitute from about 0% to about 10%, preferably about 0% to about 5%, by weight of a pipe-forming composition comprising the nanocomposite and the additives.

In another aspect, the present invention provides a pipe comprising or formed from the nanocomposite of any one of the embodiments described herein, wherein the pipe has a Minimum Required Strength of at least 10.0 MPa when evaluated according to ISO 9080 statistical procedures. In one set of embodiments, the pipe has a Minimum Required Strength that is equivalent to or greater than 10.0 MPa when evaluated according to ISO 9080 statistical procedures. In one set of embodiments, the pipe has a Minimum Required Strength that is equivalent to or greater than 11.2 MPa when evaluated according to ISO 9080 statistical procedures.

Pipes comprising or formed with a nanocomposite of the invention exhibit improvements in one or more properties, when compared with a comparative pipe prepared with the same base polyethylene resin as used in the nanocomposite without the planar carbon nanoparticles.

In one set of embodiments, a pipe comprising or formed from a nanocomposite of any one of the embodiments described herein has a Minimum Required Strength that is at least 5% greater than the Minimum Required Strength of a comparative pipe formed with the same base polyethylene resin alone.

In one set of embodiments, a pipe comprising or formed from a nanocomposite of any one of the embodiments described herein has a Long Term Hydrostatic Strength that is at least 5% greater than the Long Term Hydrostatic Strength of a comparative pipe formed with the same base polyethylene resin alone. Long Term Hydrostatic Strength is measured in mega Pascals, with the dimensions of stress, and it represents the predicted average strength at a temperature and time.

The degree (%) of improvement in Minimum Required Strength or Long Term Hydrostatic Strength over a comparative pipe may be determined by evaluating the different pipes according to ISO 9080 statistical procedures and assessing the change in result provided by the pipe prepared with the nanocomposite in comparison to the result provided by the comparative pipe.

In one set of embodiments, a pipe comprising a nanocomposite of any one of the embodiments described herein exhibits a time to failure of at least 1000 hours when tested according to ISO 1167 and subjected to a hoop stress of at least 13.8 MPa at 20° C. In some embodiments, the pipe exhibits a time to failure of at least 2000 hours when subjected to a hoop stress of at least 13.7 MPa at 20° C.

In one set of embodiments, pipe comprising a nanocomposite of any one of the embodiments described herein exhibits a time to failure of at least 200 hours when subjected to a hoop stress of at least 14.0 MPa at 20° C.

In one set of embodiments, a pipe comprising a nanocomposite of any one of the embodiments described herein exhibits a time to failure of at least 500 hours when evaluated according to the Notch Pipe Pressure Test (ISO 13479) at 920 kPa and 80° C.

In one set of embodiments, a pipe comprising, or formed from, a nanocomposite of any one of the embodiments described herein exhibits a loss in resistance to slow crack growth of no more than 50%, when compared to a comparative pipe formed with the same base polyethylene resin without the planar carbon nanoparticles. Resistance to slow crack growth may be assessed using conventional techniques such as the Pennsylvania notch test (PENT) and the notched pipe test (ISO 13479). The degree (%) of loss in slow crack growth resistance may be determined by assessing the results in slow crack growth afforded by a pipe prepared with a nanocomposite of the invention over the performance exhibited by a comparative pipe prepared with the base polyethylene resin alone.

In one form, specimens moulded from a nanocomposite of the invention has a slow crack growth property of at least 1000 hours, or at least 2000 hours, when tested following the procedure described in ASTM F-1473-97 (PENT test) at 80° C. in air and 2.4 MPa tensile stress with notch depth of 5 mm.

Pipes prepared with a nanocomposite of embodiments of the invention advantageously do not suffer from a significant loss in slow crack growth resistance, when compared to a comparative pipe formed with the same polyethylene resin without the planar carbon nanoparticles.

In one set of embodiments, a pipe comprising or formed from a nanocomposite of any one of the embodiments described herein has a slow crack growth property of at least 500 hours when tested at 80° C. and 920 kPa pressure according to ISO 13479. Slow crack growth resistance gives an indication of the time that a notched pipe can withstand a certain pressure at a certain temperature before failure.

In one set of embodiments, a pipe comprising a nanocomposite of any one of the embodiments described herein exhibits a loss in resistance to rapid crack propagation of no more than 50%, when compared to a comparative pipe formed with a base polyethylene resin without the exfoliated graphite nanoparticles. Resistance to rapid crack propagation may be assessed in accordance with ISO 13477 or using techniques such as charpy testing according to ISO 179.

It is an advantage of the invention that articles such as pipes and more particularly, pressure pipes, prepared with a nanocomposite of the invention at least meet, and in some instances exceed, one or more minimum performance requirements prescribed by various international standards for PE 100 pipe. For instance, pipes prepared with a nanocomposite of the invention may be able to withstand higher hoop stresses than conventional PE 100 pipe at room temperature. Accordingly, the invention may be advantageous in the preparation of higher performance pipes and pressure vessels.

In some instances, pipes prepared with a nanocomposite of the invention may meet or exceed one or more minimum performance requirements prescribed for PE 100 pipe.

In other instances, pipes prepared with a nanocomposite of the invention may meet or exceed the pressure performance requirements prescribed for PE 112 pipe.

In other instances, pipes prepared with a nanocomposite of the invention may meet or exceed the pressure performance requirements prescribed for PE 125 pipe.

In one set of embodiments, pipes prepared with a nanocomposite of the invention as described herein exhibit a measurable improvement in long term hydrostatic strength (as evaluated by ISO 9080 statistical procedures) while maintaining acceptable performance in terms of resistance to slow crack growth and/or resistance to rapid crack propagation. The improvement in long term hydrostatic strength is assessed in comparison to a comparative pipe prepared with the same base polyethylene resin as used in the nanocomposite, but without the planar carbon nanoparticles. The improvement in long term hydrostatic strength can be indicative of an improvement in load bearing performance for the pipe, which is afforded through the use of the nanocomposite in the manufacture of the pipe.

Nanocomposites of the invention also retain acceptable processing qualities while also exhibiting improvements in strength and other mechanical properties.

The nanocomposite of the present invention advantageously enables high performance pressure pipes with one or more improved mechanical properties to be achieved without the need to alter the chemical composition of the base polyethylene resin. Improvements in mechanical properties are attributed to the presence of the planar carbon nanoparticles, which are dispersed in the base polymer resin, and provide reinforcement for the base polymer resin. The present invention therefore allows conventional base polyethylene resins to be used in pipe manufacture, however enables one or more desirable pipe properties to be enhanced without significant loss of other properties, due to the presence of the nanoparticles. For example, it has been found that a pipe formed with a nanocomposite comprising a PE 100 resin and planar carbon nanoparticles exhibited a load bearing performance, as shown by resistance to internal pressure, that exceeded that obtained for a comparative pipe prepared with the same PE 100 resin alone.

While the above improvements have been described by reference to pipe products, one skilled in the relevant art would appreciate that the improvements afforded by the nanocomposite of the invention may also be applicable to a range of other manufactured products and articles.

EXAMPLES

The present invention is described with reference to the following examples. It is to be understood that the examples are illustrative of and not limiting to the invention described herein.

Figure 6:
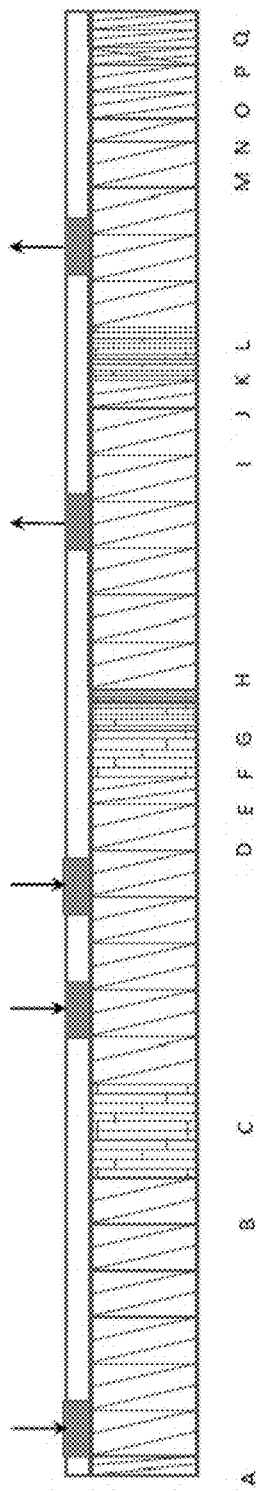
FIG. 6 is a schematic of the screw configuration of the twin screw compounder used to melt mix the components of the composition.

Preparation of Nanocomposite:

Various exfoliated graphite nanoparticles (xGnP) were sourced from commercial suppliers and used as the planar carbon nanoparticle. PE 100 resin was used as a base polyethylene resin. The base polyethylene resin powder and nanoparticles were compounded in a ZSK25 twin screw compounder schematically represented in FIG. 6. In FIG. 6 the letters A-Q represent specific screw elements detailed in Table 1.

TABLE 1

| Letter | Screw Element |
|---|---|
| A | 16/16 |
| B | 6 × 36/36 |
| C | 2 × KB45/5/36 |
| D | 6 × 36/36 |
| E | 24/24 |
| F | KB45/5/36 |
| G | KB45/5/24 |
| H | KB45/5/12 |
| I | 6 × 36/36 |
| J | 24/24 |
| K | KB45/5/24 |
| L | KB90/5/24 |
| M | 4 × 36/36 |
| N | 36/18 |
| O | 2 × 24/24 |
| P | SME 16/16 |
| Q | 2 × 16/16 |

All elements of the twin screw compounder were right-handed elements unless designated otherwise. For screw elements referred to in Table 1 the first number is the pitch, given in distance (mm) traveled in one revolution. The second number is the length of the element (mm).

"KB" indicates a kneading block. The first number is the angle formed by the paddles on the kneading block when compared to the line through the screw shaft, in degrees. The second number is how many paddles are on one element. The third number is the length of the element (mm).

"LH" indicates a left-handed element.

The base polyethylene resin powder and the nanoparticles were fed into the compounder using a gravimetric feeder. The polymer resin and nanoparticles were tumble blended and then placed in the main hopper. A processing temperature of least 200° C. was used with specific energy input greater than 0.10 kWhr/kg. The results are shown in Table 2.

TABLE 2

Nanocomposites formed with PE 100 resin and exfoliated graphite nanoparticles (xGnP).

| Example | Carbon nanoparticle (xGnP) | Quantity of nanoparticle (kg) | Quantity of PE100 resin (kg) | % xGnP in nanocomposite (w/w) |
|---|---|---|---|---|
| 1 | xGnP1 | 1 | 19 | 5% |
| 2 | xGnP1 | 1.6 | 18.4 | 8% |
| 3 | xGnP1 | 2 | 18.0 | 10% |
| 4 | xGnP1 | 2.6 | 17.4 | 13% |
| 5 | xGnP2 | 1 | 19 | 5% |
| 6 | xGnP2 | 1.6 | 18.4 | 8% |
| 7 | xGnP2 | 2 | 18.0 | 10% |
| 8 | xGnP2 | 2.6 | 17.4 | 13% | xGnP1—Exfoliated synthetic graphite. Average particle size 1.8 microns. BET surface area 350 sq·m/g. Aspect ratio—800-1000 xGnP2—Exfoliated natural graphite. Average particle size 2.2 microns. BET surface area 400 sq·m/g. Aspect ratio>1000.

PE100 Resin: Refer Table 3.

TABLE 3

Composition and properties of PE100

| PARAMETER | UNITS | TARGET | NORMAL OPERATING RANGE |
|---|---|---|---|
| Catalyst (Titanium) | mol | 12 | 10.0-14.0 |
| Batch size | kg | 20,000 | 18,000-22,000 |
| STAGE 1 | | | |
| Nitrogen sparge | m$^3$ | 60 | 30-80 |
| Start Temperature | ° C. | 74 | 70-80 |
| Prepoly addition | kg | 8800 | 7500-10000 |
| Prepoly gas rate | t/h | 3.5 | 3.0-5.0 |
| Comonomer addition | kg | 330 | 250-400 |
| Stage 1 temperature | ° C. | 80 | 75-85 |
| STAGE 2 | | | |
| Homo poly addition | kg | 11200 | 10000-12500 |
| Homo poly gas rate | t/h | 5.0 | 3.0-7.0 |
| Hydrogen injection | kPa | 400 | 300-500 |
| Stage 2 temperature | ° C. | 85 | 80-90 |
| PROPERTIES | | | |
| VZ | mL/g | 900 | 600-1100 |
| MI$_5$ pneumex reactor powder | g/10 min | 0.35 | 0.15-0.4 |
| MFR pneumex reactor powder | MI$_{21.6}$/MI$_5$ | 20 | 14-36 |
| Density | g/cm$^3$ | 0.954 | 0.950-0.960 |

Comparative Nanocomposites:

Comparative nanocomposites were also prepared by forming comparative masterbatches containing PE 100 resin and 5% by weight of a comparative nanoparticle. A selected quantity of each of the comparative masterbatches was then melt blended with PE 100 resin to form comparative nanocomposites. The comparative nanoparticles employed in the formation of the comparative nanocomposites were: carbon nanotubes (CNT), polyhedral oligomeric silsesquioxane (POSS), montmorillonite (MMT) nanoclay, halloysite nanotubes (HNT) and titanium dioxide ($TiO_2$). If necessary, a compatibiliser (such as SEBS-g-MMA or PE-g-MMA) was added to either the masterbatch composition or to the nanocomposite to enhance the compatibility of the nanoparticle with the polymer resin. The results are shown in Table 4.

FIG. 1 is a graph showing the change in yield stress exhibited by Example 1 and Comparative Examples CE1 (5% $TiO_2$), CE4 (5% POSS), CE8 (4% MMT), CE14 (4% MMT (Cloisite® 15A)/2% SEBS-g-MA), CE17 (4% MMT (Cloisite® 15A)/4% PE-g-MA), CE18 (4% MMT (Cloisite® 15A)/8% PE-g-MA), CE20 (4% MMT (Cloisite® 25A)/8% PE-g-MA) and CE24 (10% PE-g-MA), over that of a PE100 control sample. The change in tensile yield stress (% increase from control) provides an indication of potential improvement in long term hydrostatic strength that may be achieved in a pressure pipe formed with the nanocomposite. From the results shown in FIG. 1 it can be seen that a nanocomposite comprising PE100 resin and 5%

TABLE 4

Comparative nanocomposites formed with PE 100 resin and various nanoparticles

| Comp. Example | Nanoparticle (NP)/ Compatibiliser | Quantity of 5% masterbatch (kg) | Quantity of PE 100 resin (kg) | % NP in nano-composite (w/w) | % Compatibiliser (w/w) |
|---|---|---|---|---|---|
| CE 1 | $TiO_2$ | 20 | 0 | 5% | 0 |
| CE 2 | POSS | 6 | 14 | 1.5% | 0 |
| CE 3 | POSS | 12 | 8 | 3% | 0 |
| CE 4 | POSS | 20 | 0 | 5% | 0 |
| CE 5 | CNT | 6 | 14 | 1.5% | 0 |
| CE 6 | CNT | 12 | 8 | 3% | 0 |
| CE 7 | MMT (Cloisite® 15A) | 8 | 12 | 2% | 0 |
| CE 8 | MMT (Cloisite® 15A) | 16 | 4 | 4% | 0 |
| CE 9 | MMT (Cloisite® 15A)/SEBS-g-MMA | 6 | 14 | 1.5% | 3% |
| CE 10 | MMT (Cloisite® 15A)/SEBS-g-MMA | 6 | 14 | 1.5% | 1.5% |
| CE 11 | MMT (Cloisite® 15A)/SEBS-g-MA | 8 | 12 | 2% | 1% |
| CE 12 | MMT (Cloisite® 15A)/SEBS-g-MA | 12 | 8 | 3% | 3% |
| CE 13 | MMT (Cloisite® 15A)/SEBS-g-MA | 12 | 8 | 3% | 6% |
| CE 14 | MMT (Cloisite® 15A)/SEBS-g-MA | 16 | 4 | 4% | 2% |
| CE 15 | MMT (Cloisite® 15A)/PE-g-MA | 8 | 12 | 2% | 2% |
| CE 16 | MMT (Cloisite® 15A)/PE-g-MA | 8 | 12 | 2% | 4% |
| CE 17 | MMT (Cloisite® 15A)/PE-g-MA | 16 | 4 | 4% | 4% |
| CE 18 | MMT (Cloisite® 15A)/PE-g-MA | 16 | 4 | 4% | 8% |
| CE 19 | MMT (Cloisite® 25A)/PE-g-MA | 16 | 4 | 4% | 4% |
| CE 20 | MMT (Cloisite® 25A)/PE-g-MA | 16 | 4 | 4% | 8% |
| CE 21 | HNT/PE-g-MA | 20 | 0 | 5% | 5% |
| CE 22 | HNT/PE-g-MA | 20 | 0 | 5% | 10% |
| CE 23 | HNT/PE-g-MA | 20 | 0 | 5% | 2.5% |
| CE24 | 0/PE-g-MA | 0 | 20 | 0% | 10% |

Mechanical Properties:

The mechanical properties of the nanocomposites of Table 2 and the comparative nanocomposites of Table 4 were evaluated using tensile testing at a strain rate of 25 or 50 mm/min in order to determine properties such as tensile yield stress, tensile strength and ultimate elongation. A control sample of PE100 resin alone (without nanoparticles or compatibiliser) was also tested.

(w/w) xGnP provides an improvement in tensile yield stress of at least 4%, whereas the comparative examples provide no improvement in tensile yield stress over the PE100 control sample.

Figure 2:
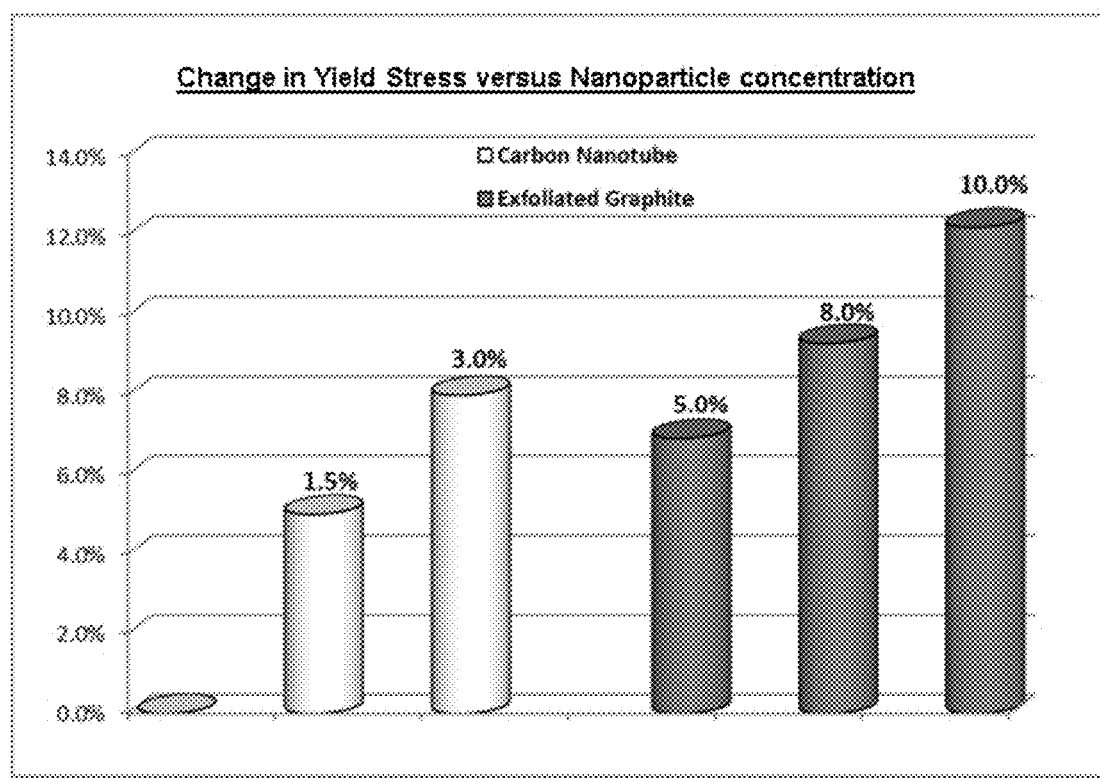
FIG. 2 is a graph illustrating the percent change in tensile yield stress obtained in nanocomposites of embodiments of the invention containing exfoliated graphite nanoparticles and comparative nanocomposites containing carbon nanotubes, relative to a PE 100 resin control sample.
Figure 3:
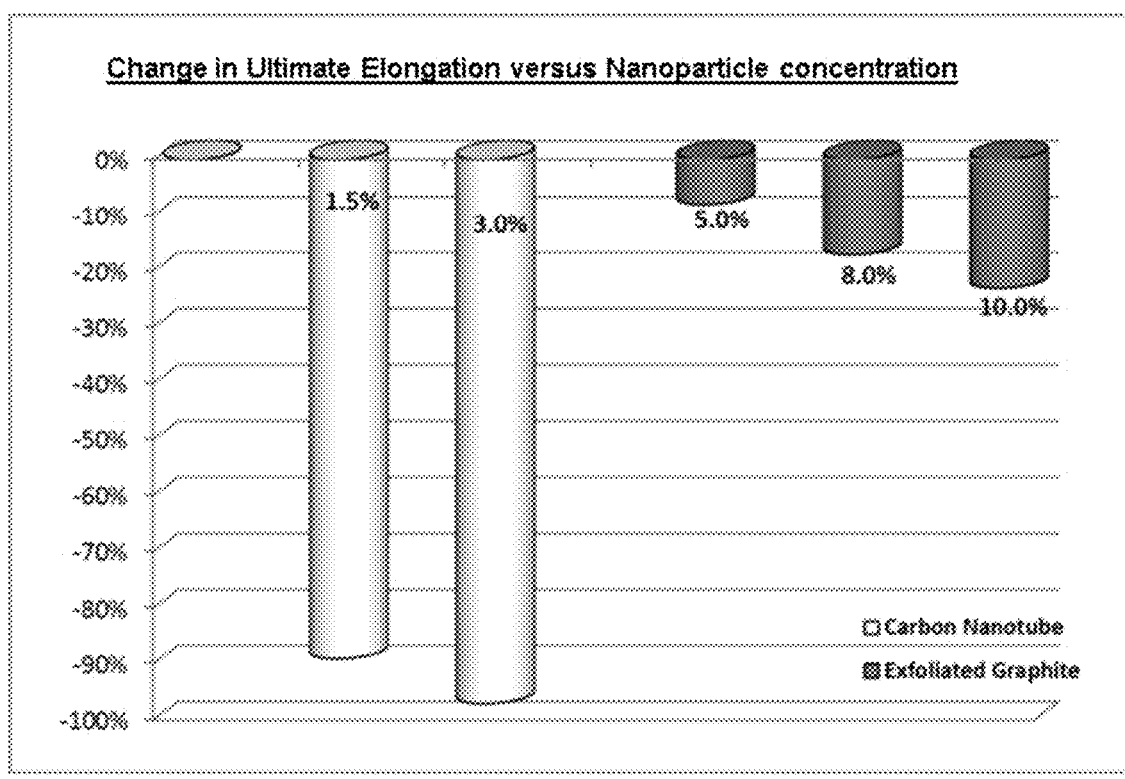
FIG. 3 is a graph illustrating the percent change in ultimate elongation observed with nanocomposites of embodiments of the invention containing exfoliated graphite nanoparticles and comparative nanocomposites containing carbon nanotubes, relative to a PE 100 resin control sample.

FIGS. 2 and 3 shows the results of tensile testing for Examples 1 to 3 and Comparative Examples CE5 and CE6, which contain carbon nanotubes. The results of FIG. 2 demonstrate that the tensile yield stress of PE100 polymer resin can be significantly improved by adding xGnP to the polymer matrix. However, the presence of xGnP also resulted in a decrease in ultimate elongation, as shown in FIG. 3. Moreover, the loss in ultimate elongation was less than 30%, and much less than the loss observed with comparative nanocomposites containing carbon nanotubes. Furthermore, as shown in FIG. 3, the nanocomposites containing xGnP do not exhibit an unacceptable loss of toughness as indicated by the ultimate elongation of the nanocomposite material compared to comparative nanocomposites containing carbon nanotubes.

Melt Flow Index:

Melt flow index (MFI) testing under 5 kg weight was conducted in order to evaluate the processability of nanocomposites of the invention, when compared to a PE 100 resin control and various comparative nanocomposites containing different types of nanoparticles.

Melt flow index testing of a PE 100 resin control, Examples 1, 2 and 4 and various Comparative Examples was conducted in accordance with ISO 1133. The results are shown in FIG. 4.

Figure 4:
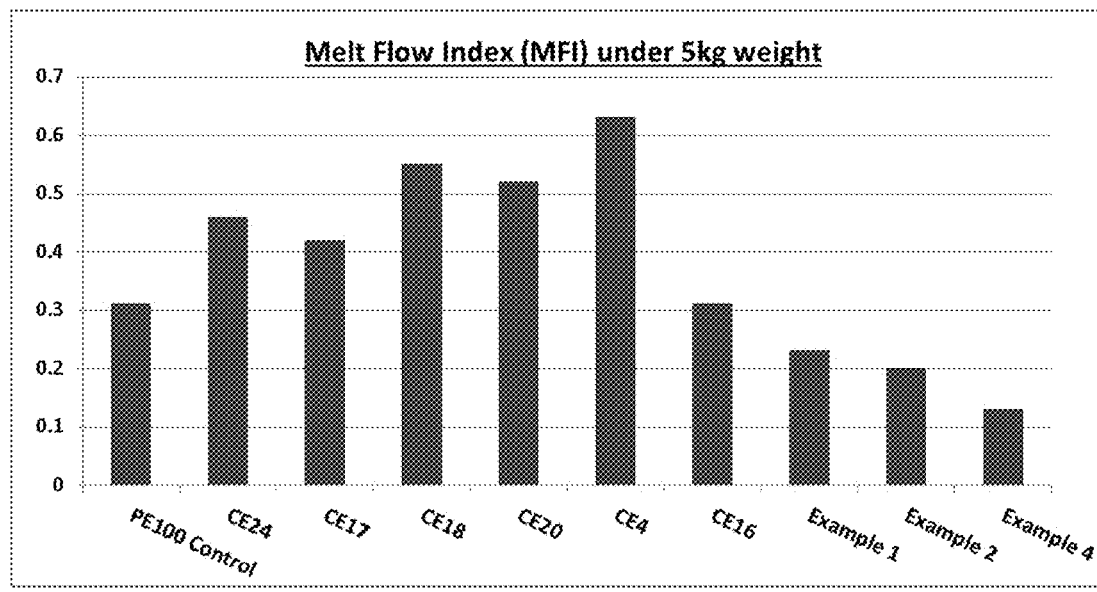
FIG. 4 is a graph showing the melt flow index under 5 kg of weight for a PE 100 resin control sample, comparative nanocomposites comprising various comparative nanoparticles, and a nanocomposites of embodiments of the invention comprising various quantities of exfoliated graphite nanoparticles.

As seen in FIG. 4, nanocomposites of the invention containing a PE 100 base resin and 5%, 8% or 13% xGnP exhibit acceptable processability and melt flow properties.

PENT and Charpy tests:

Slow crack growth resistance and rapid crack propagation resistance can be evaluated using the Pennsylvania notch test (PENT) and low temperature charpy impact tests. The changes in these properties are consistent with the tensile strength and ultimate elongation data. A nanocomposite containing 5% xGnP improved tensile yield stress while exhibiting acceptable performance when evaluated using the PENT test and low temperature Charpy test, as shown in the Table 5.

TABLE 5

|  | PENT @ 80° C. 5 mm Notch depth (Hrs to fail) | Charpy Impact Strength @ 0° C. (kJ/sq. m) | Tensile yield stress (MPa) |
| --- | --- | --- | --- |
| PE100 | >2500 | 18 | 24.6 |
| PE100 + 5% xGnP | >2500 | 10 | 26.3 |

Pipe Pressure Performance

Figure 7:
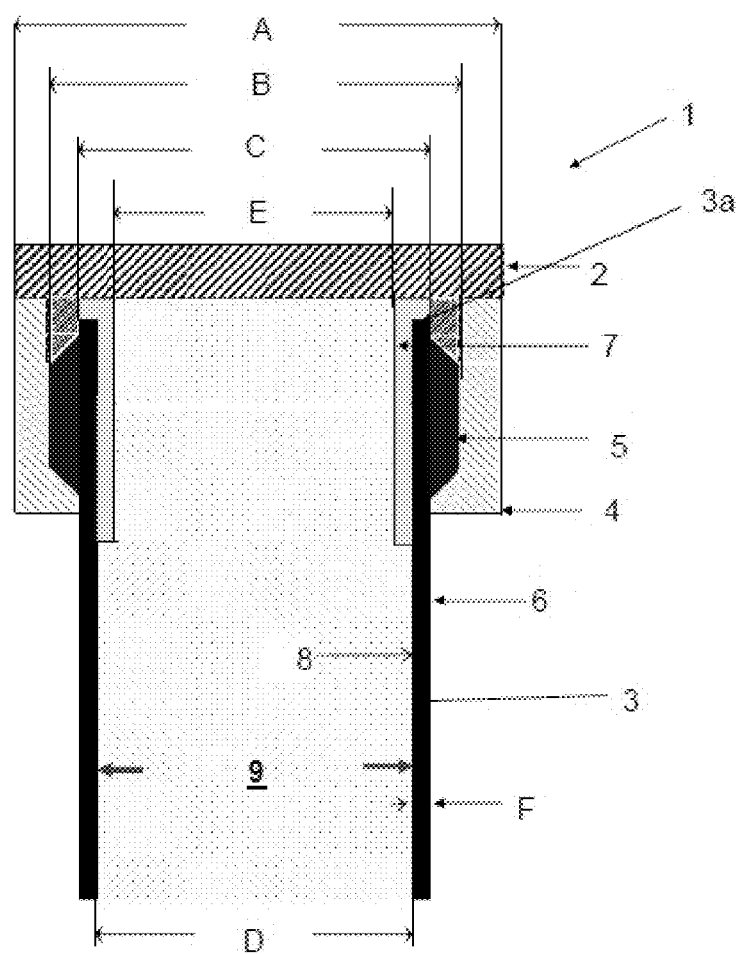
FIG. 7 is a schematic of the dimensions of the pipe sample that was pressured and assessed for hoop stress and resistance to internal pressure.

Pipes were moulded on a Battenfeld pipe extruder according to standard industry protocols to the dimensions described in FIG. 7. Refer Table 6 for pipe extruder settings.

TABLE 6

| Extruder Conditions | Set point | PE100 Actual | Example 3 Actual |
| --- | --- | --- | --- |
| Zone 1 Temperature (° C.) | 190 | 190 | 190 |
| Zone 2 Temperature (° C.) | 200 | 195 | 196 |
| Zone 3 Temperature (° C.) | 200 | 200 | 200 |
| Zone 4 Temperature (° C.) | 200 | 200 | 200 |
| Adaptor Temperature (° C.) | 210 | 210 | 210 |
| Die 1 Temperature (° C.) | 210 | 210 | 210 |
| Die 2 Temperature (° C.) | 210 | 210 | 210 |
| Die 3 Temperature (° C.) | 200 | 200 | 200 |
| Die 4 Temperature (° C.) | 210 | 210 | 210 |
| Melt Temperature (° C.) |  | 229 | 237 |
| Screw Speed (RPM) |  | 49 | 49 |
| Motor Load (Amps) |  | 72.8 | 75.1 |
| Back Pressure (Bar) |  | 175 | 201 |
| Line Speed (m/min) |  | 3.5 | 3.2 |

TABLE 6-continued

| Extruder Conditions | Set point | PE100 Actual | Example 3 Actual |
| --- | --- | --- | --- |
| Haul off gearbox |  | 248 | 222 |
| Vacuum (MPa) |  | 27 | 27 |
| Water Temperature (° C.) |  | 25 | 25 |

After conditioning for 24 hours, the test samples were subjected to a specified constant internal hydrostatic pressure for a specified period of time or until failure in accordance with the method outlined in ISO 1167.

Referring to FIG. 7 there is shown a schematic drawing of a test rig (1) used to assess hoop stress. The test rig (1) comprises a threaded metal lid (2) of dimension (A) of ID 43.5 mm retaining a pipe sample (3) at one end (3a) of the pipe sample between:

(a) an assembly on the threaded metal lid (2) of external threaded metal ring (4) with internal rubber O-ring (olive) (5) of external diameter (B) of 40 mm and internal diameter (C) 30.8 mm abutting the outerside (6) of the pipe sample (3); and (b) an internal plastic seal (thimble) (7) abutting the inside (8) of the pipe sample (2) having internal diameter (D) of 28.9 mm.

The plastic seal (7) has an internal diameter (E) of 20.5 mm. The pipe sample wall thickness (F) is 1.9 to 2.2 mm.

The hoop stress testing is carried out by subjecting the lumen (9) of the pipe sample (3) to hydrostatic pressure.

The Long term hydrostatic strength and minimum required strength were then determined from the data in accordance with ISO 9080.

Figure 5:
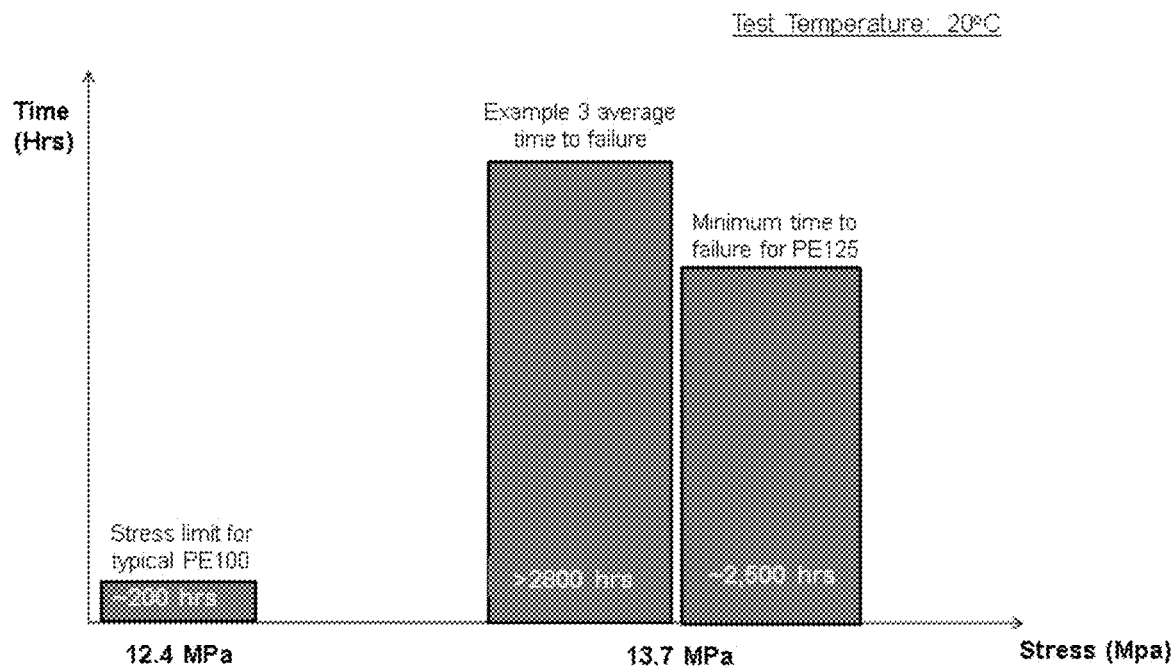
FIG. 5 is a bar graph comparing the typical time to failure at 20° C. of PE100 pipe under a hoop stress of 12.4 MPa (the stress limit for typical PE100) with the theoretical performance of PE125, and a pipe moulded from PE 100 plus 10% w/w of xGnP1, in accordance with the invention, under a hoop stress of 13.7 MPa.

The results plotted in FIG. 5 compare the average time to failure of PE100 pipe under a hoop stress of 12.4 MPa (the stress limit for typical PE100) with that of pipe of the composition of Example 3 and theoretical PE 125 (as evaluated by ISO 9080 statistical procedures). The time to failure of the pipes is approximately 200 hours for PE 100, greater than 2800 hours for the composition of the invention of Example 3 and about 2500 hours for theoretical PE125.

The composition of the invention shows a significant improvement in hoop stress resistance over PE 100 at higher stress levels and performance akin to what can be expected of a PE 125 composition.

Table 5 above also shows the maintenance of slow crack growth resistance as measured by PENT, compared with PE 100 and acceptable impact strength while achieving a very significant improvement in tensile yield stress from 24.6 to 26.3 MPa.

The improvement in yield stress is also presented in FIG. 1 which shows that while other nanoparticles do not achieve an improvement in yield stress, the composition of the invention comprising planar nanoparticles, specifically exfoliated graphite, significantly increase yield stress.

FIG. 3 further demonstrates that while carbon nanotubes significantly increased yield stress of polyethylene it was at the expense of ductility and toughness of the composition. On the other hand, the corresponding composition comprising exfoliated graphite achieved a similar improvement in yield stress without overly compromising the toughness of the composite.

The results shown above correlate with a significant improvement in resistance to internal pressure arising from the presence of planar carbon nanoparticles, particularly exfoliated graphite, in a base polyethylene resin for preparation of PE 100. In particular, the improvement in tensile yield stress and time to failure of pipes tested at higher hoop stresses at 20° C. correlate with a significant increase in MRS from PE 100.

The invention claimed is:

1. A polyethylene nanocomposite composition comprising:
   (i) base polyethylene resin selected from the group consisting of PE80, PE100 and PE112 resins according to ISO 1167, wherein the base polyethylene resin has a melt flow index in the range of 0.10 to 1.4 g/10 min at 190° C. and 5 kg as measured according to ISO 1133; and
   (ii) planar carbon nanoparticles having a BrunauerEmmettTeller (BET) theory surface area in the range of 200 $m^2$/g to 800 $m^2$/g, in an amount of from 0.1% to 20% by weight based on the weight of the polyethylene nanocomposite composition,
   wherein the polyethylene nanocomposite composition has at least 5% greater Minimum Required Strength (MRS) relative to the base polyethylene resin absent the planar carbon nanoparticles as evaluated according to ISO 9080.

2. The polyethylene nanocomposite composition according to claim 1, wherein the base polyethylene resin of has a multimodal molecular weight distribution.

3. The polyethylene nanocomposite composition according to claim 1, wherein the base polyethylene resin has a multimodal molecular weight distribution comprising at least one alpha-olefinic comonomer regularly incorporated into a high molecular weight fraction of the base polymer to achieve between 0.5% to 8% weight concentration in the high molecular weight fraction.

4. The polyethylene nanocomposite composition according to claim 3, wherein the alpha-olefinic comonomer is present in an amount from 2% to 4% by weight of the high molecular weight fraction.

5. The polyethylene nanocomposite composition according to claim 3, wherein the alpha-olefinic comonomer is selected from the group consisting of 1-butene, 1-pentene, 1-hexene, 1-heptene, 1-octene, and mixtures thereof.

6. The polyethylene nanocomposite composition according to claim 1 further comprising one or more additional components in a total amount up to 10% w/w of the polyethylene nanocomposite composition.

7. The polyethylene nanocomposite composition according to claim 1, wherein the planar carbon nanoparticles are selected from the group consisting of graphene, graphite, exfoliated graphite, and mixtures thereof.

8. The polyethylene nanocomposite composition according to claim 1, wherein the planar carbon nanoparticles are exfoliated graphite nanoparticles.

9. The polyethylene nanocomposite composition according to claim 1, wherein the planar carbon nanoparticles are present in an amount from 1% to 15% by weight based on the weight of the nanocomposite composition.

10. The polyethylene nanocomposite composition according to claim 1, wherein the base polyethylene resin has a bimodal molecular weight distribution.

11. The polyethylene nanocomposite composition according to claim 10 wherein the bimodal molecular weight distribution comprises a low molecular weight fraction in an amount in the range of from 30% to 60% by weight of the weight of the base polyethylene resin and a high molecular weight fraction in an amount of from 70% to 40% by weight of the weight of the base polyethylene resin.

12. The polyethylene nanocomposite composition according to claim 1 which has a tensile yield stress of at least 23 MPa when measured at 23° C. and a strain rate of 25 mm/min in accordance with ASTM D638.

13. The polyethylene nanocomposite composition according to claim 12 wherein the tensile yield stress is in the range of from about 24 to 35 MPa when measured at 23° C. and a strain rate of 25 mm/min in accordance with ASTM D638.

14. A pipe comprising the polyethylene nanocomposite of claim 1.

15. The polyethylene nanocomposite composition according to claim 1, which exhibits a slow crack growth resistance of at least 1000 hours when measured according to ASTM F1473-97 at 80° C. in air.

16. A method of improving the Minimum Required Strength (MRS) of a polyethylene composition for pipe manufacture, the method comprising:
   providing a base polyethylene resin selected from the group consisting of PE80, PE100 and PE112 resins according to ISO 1167, wherein the base polyethylene resin has a melt flow index in the range of 0.10 to 1.4 g/10 min at 190° C. and 5 kg as measured according to ISO 1133; and
   blending the resin with planar carbon nanoparticles of BET surface area of from 200 $m^2$/g to 800 $m^2$/g, to form a polyethylene nanocomposite composition as an extrudable composition;
   wherein the polyethylene nanocomposite composition has at least 5% greater MRS relative to the base polyethylene resin absent the planar carbon nanoparticles as evaluated according to ISO 9080.

17. The method according to claim 16, wherein the base polyethylene resin is bimodal, comprises a low molecular weight fraction of from 30% to 60% by weight and a high molecular weight fraction in an amount of from 70% to 40% by weight of the base polyethylene resin and wherein the high molecular weight fraction incorporates 0.5% to 8% by weight of at least one alpha-olefinic comonomer which is regularly distributed in the high molecular weight fraction.

18. The method according to claim 16, wherein the method further comprises forming a pipe by extruding the extrudable composition.

* * * * *

UNITED STATES PATENT AND TRADEMARK OFFICE
CERTIFICATE OF CORRECTION

PATENT NO. : 10,626,243 B2
APPLICATION NO. : 15/326760
DATED : April 21, 2020
INVENTOR(S) : Adetunji et al.

Page 1 of 1

It is certified that error appears in the above-identified patent and that said Letters Patent is hereby corrected as shown below:

In the Claims

In Claim 2, at Column 23, Line 24, delete the word "of".

Signed and Sealed this
Sixteenth Day of June, 2020

Andrei Iancu
*Director of the United States Patent and Trademark Office*